R. J. PATTERSON.
ELECTRICALLY HEATED FIRELESS COOKER.
APPLICATION FILED OCT. 5, 1920.
1,405,624.
Patented Feb. 7, 1922.
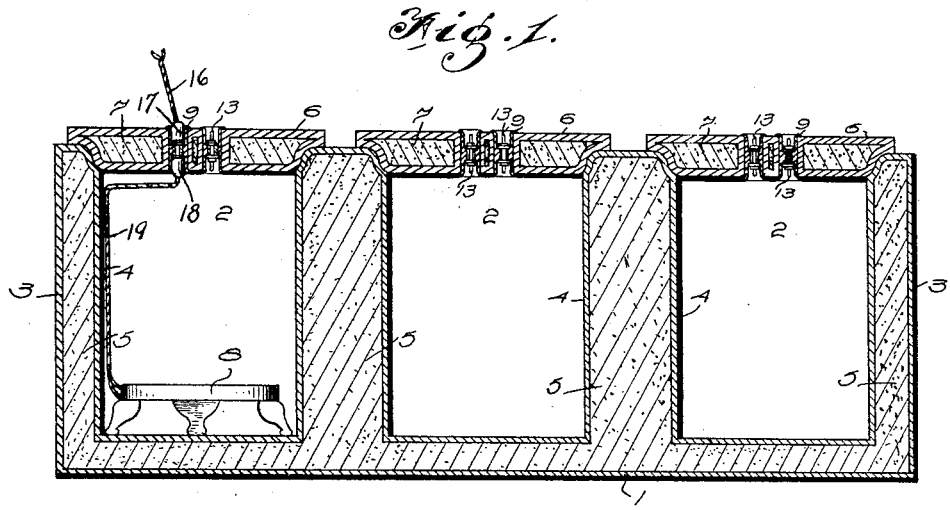
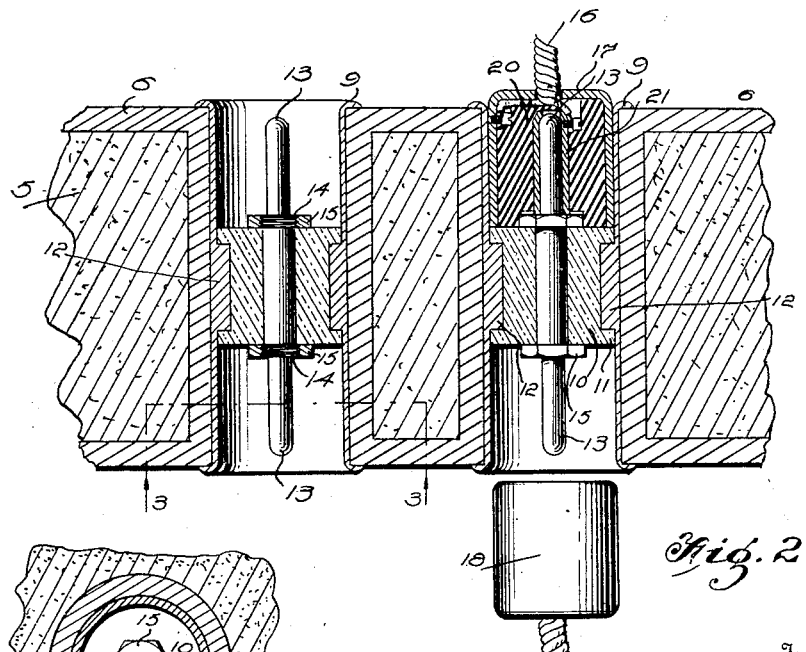
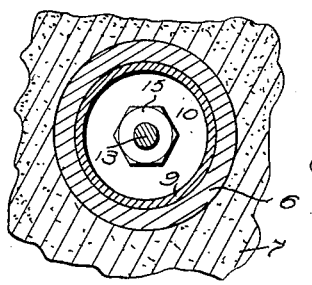
Inventor
RALPH J. PATTERSON
By
C. L. Farler Attorney

UNITED STATES PATENT OFFICE.

RALPH J. PATTERSON, OF BOSTON, MASSACHUSETTS.

ELECTRICALLY-HEATED FIRELESS COOKER.

1,405,624.  Specification of Letters Patent.  Patented Feb. 7, 1922.

Application filed October 5, 1920. Serial No. 414,745.

*To all whom it may concern:*

Be it known that I, RALPH J. PATTERSON, a citizen of the United States, residing at Boston, in the county of Suffolk and State of Massachusetts, have invented certain new and useful Improvements in Electrically-Heated Fireless Cookers, of which the following is a specification.

This invention relates to electric heaters, and more particularly to attachments for heating fireless cookers, and it comprises the combination of a heating chamber, a heating element removably arranged in the chamber, and a socket for connecting said heating element to a source of current, said socket comprising an outer cylindrical member arranged in one of the walls of the heating chamber, an insulating bushing arranged in said socket, said bushing being adapted to close the opening in the cylindrical member to prevent loss of heat, and a rod or pin supported in said bushing and spaced from said cylindrical member, said cylindrical member and said rod forming the two contacts of said socket and being adapted to receive a plug arranged on the end of the usual electric conducting wires.

In the present invention, I have provided a portable electrical heater to be used as an attachment for fireless cookers and have devised means for delivering current to said heater without permitting the escape of heat from the heating chamber. With a heating element arranged to be heated within the cell of the cooker, a great saving of heat is accomplished. The heating element may be first heated to the desired temperature and the food to be cooked then placed in the cooker in the same manner that is now employed where the stone is first heated and then placed in the cooker when the desired temperature is reached. A single heating element may be employed to heat one or more compartments of the cooker, the heating element being removable. Where a single heating element is used for one or more compartments, the usual soap stones, or other heating bricks, may be employed in connection therewith and the stones heated in a single compartment and then placed in the other compartments. Where the heater is used in the compartment in which the food is to be cooked, the stone in which the heating element is embedded and which forms a part of the heating element, retains sufficient heat and it is unnecessary to employ an auxiliary heating brick.

In the present invention, I have provided an improved type of socket for delivering current to the heating element which is a very simple construction and which conveys the current through the walls of the heating chamber without permitting the escape of heat.

In the accompanying drawings, I have shown one embodiment of the invention. In this showing, Figure 1 is a vertical longitudinal sectional view through a fireless cooker showing the improved type of socket.

Figure 2 is a detailed enlargement showing the sockets arranged in the wall of the cooker, and Figure 3 is a section on the line 3—3 of Figure 2.

Referring to the drawings, the reference numeral 1 designates generally a fireless cooker having a plurality of compartments 2. The cooker is provided with outer walls 3 and inner walls 4, suitable insulating material 5 being arranged between the walls of the cooker to prevent radiation of heat. Each of the compartments is provided with a double wall cover 6 having suitable heat insulating material 7 arranged therebetween. The construction heretofore described is the usual fireless cooker construction and forms no part of the present invention except in the combination claimed.

An electric heating element 8 of usual construction is adapted to be arranged in the bottom of either of the compartments 2. As shown, the heating element is removably placed in the cooker, resting on the bottom of the compartment and may be readily removed and placed in any of the compartments. An electric socket is arranged in an opening in one of the walls of each compartment. As shown, the socket comprises an outer cylinder member 9 fitting within the opening and forming one of the contacts of the sockets. An insulating bushing 10 is arranged within the cylindrical member. As shown, the outer periphery of the bushing is provided with end flanges 11 forming a central recess adapted to receive an annular projection 12 on the cylindrical member to retain the bushing in position. The bushing fits snugly within the cylindrical member to prevent escape of heat through the opening.

The center contact member comprises a pin 13 projecting through the bushing and provided with threads 14 arranged above and below the bushing. Nuts 15 are arranged on these threads whereby the center contact member is held in position. Current is delivered to the socket from any suitable source by lead wires 16 and plug 17 and is conducted to the electric heater from the other end of the socket by plug 18 and lead wires 19. The lead wires 19 are connected to the electric heating element in any suitable manner (not shown). Each of the plugs is provided with an insulating member 20, supporting an inner metallic conductor 21. One of the lead wires is connected to the outer shell of the plug which contacts with the cylindrical member 9, and the other wire to the shell 21 which contacts with the central contact member of the socket.

The operation of the device will be apparent to those skilled in the art. The heating element is arranged in one of the cells or compartments of the fireless cooker and connected to the socket by means of lead wires 19 and plug 18. The socket is similarly connected to a source of current by means of plug 17 and lead wires 16. Current is allowed to flow for sufficient time to heat the heating element 8 to the desired temperature and the cooker is then employed in the usual manner. The attachment is simple and may be readily installed upon any of the standard makes of fireless cookers whereby the ordinary fireless cooker may be transformed into an electric oven with very small expense.

In the accompanying drawings, I have shown two sockets provided for each compartment of the cooker. Under some conditions it is advisable to arrange heating elements above and below the substance to be cooked. Under such conditions, an additional heating element (not shown) is arranged on top of a pan or other receptacle (not shown) in the compartment of the cooker, and this heating element is connected to the second socket in the manner heretofore described.

It is to be understood that, while I have described the preferred embodiment of my invention, various changes in the shape, size, and arrangement of parts may be resorted to without departing from the spirit of the invention or the scope of the subjoined claims.

Having thus described my invention, I claim:

1. The combination with a fireless cooker and a heating element arranged therein, of a socket arranged in one of the walls of the cooker, said wall being provided with an opening, said socket comprising an outer cylindrical member arranged in the wall, an insulating bushing arranged in said outer cylindrical member and adapted to prevent loss of heat from the cooker, a central contact member supported within said bushing, means for electrically connecting said socket to a source of current, and means for electrically connecting said heating element to said socket.

2. The combination with a fireless cooker having an opening arranged in one wall and an electric heating element arranged in said cooker, of an electric socket comprising an outer cylindrical member arranged in said opening, said outer cylindrical member being provided with an annular enlargement, an insulating bushing disposed in said cylindrical member and supported on said enlargement, said insulating member being adapted to prevent loss of heat from said chamber, and a central contact member supported in said insulated bushing and projecting above and below the same, means for delivering current to said socket, and means for delivering current from said socket to said electric heating element.

3. The combination with a fireless cooker having an opening in one wall, of an electric socket arranged therein comprising an outer cylindrical member forming one contact, an insulating bushing arranged in said cylindrical member and adapted to close said opening, a second contact supported in said bushing and projecting above and below the same, said second contact being provided with spaced threaded portions to retain said member in position, means for conveying current to said socket, a heating element arranged in said cooker, and means for conveying current from said socket to said heating element.

In testimony whereof I affix may signature in presence of two witnesses.

RALPH J. PATTERSON.

Witnesses:
C. N. PERKINS,
THOMAS N. WEEKS.